US012793100B2

(12) United States Patent
Wu et al.

(10) Patent No.: US 12,793,100 B2
(45) Date of Patent: Nov. 10, 2026

(54) MULTICOLINEARITY

(71) Applicant: Airbnb, Inc., San Francisco, CA (US)

(72) Inventors: Yufei Wu, Daly City, CA (US); Zhiying Gu, Seattle, WA (US); Shaojie Deng, Bellevue, WA (US); Jikun Zhu, San Francisco, CA (US); Linsha Chen, Sunnyvale, CA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

(21) Appl. No.: 18/778,413

(22) Filed: Jul. 19, 2024

(65) Prior Publication Data

US 2025/0029144 A1 Jan. 23, 2025

Related U.S. Application Data

(60) Provisional application No. 63/528,349, filed on Jul. 21, 2023.

(51) Int. Cl.
*G06Q 30/02* (2023.01)
*G06Q 30/0201* (2023.01)
*G06Q 30/0242* (2023.01)

(52) U.S. Cl.
CPC ..... *G06Q 30/0244* (2013.01); *G06Q 30/0201* (2013.01); *G06Q 30/0246* (2013.01)

(58) Field of Classification Search
CPC ............... G06Q 10/02; G06Q 30/0244; G06Q 30/0201; G06Q 30/0246; G06Q 30/0205; G06Q 30/0254; G06Q 10/067
See application file for complete search history.

(56) References Cited

U.S. PATENT DOCUMENTS 8,782,045 B1 * 7/2014 Vaver ................ G06F 18/23213 707/736
8,914,366 B1 * 12/2014 Li ......................... G06F 16/285 707/739

(Continued)

FOREIGN PATENT DOCUMENTS

WO WO 2017/104919 A1 * 6/2017 ......... H04N 21/8547

OTHER PUBLICATIONS

Puneet Garg; Rinkle Rani; Sumit Miglani, Mining Professional's Data from Linkedin (Englcih), 2015 Fifth International Conference on Advances in Computing and Communications (ICACC) (2015, pp. 98-101), Sep. 1, 2015 (Year: 2015).*

*Primary Examiner* — Marilyn G Macasiano
(74) *Attorney, Agent, or Firm* — Schwegman Lundberg & Woessner, P.A.

(57) ABSTRACT

Systems and methods described herein retrieve data from a data store, the data comprising marketing data associated with a plurality of advertising channels disposed in a plurality of geographic units. The systems and methods pre-process the data to derive a pre-processed data set, and hierarchically cluster the pre-processed data set. The systems and methods further derive a reduced multicollinearity data set having one or more clusters based on the hierarchically clustering by reducing a distance metric among geographic units of the plurality of geographic units that are disposed inside the one or more clusters, and analyze the one or more clusters with a model to generate one or more visualizations used to increase an impression impact, increase a carryover, or a combination thereof, in at least one of the plurality of advertising channels.

20 Claims, 12 Drawing Sheets
(1 of 12 Drawing Sheet(s) Filed in Color)

(56) References Cited

U.S. PATENT DOCUMENTS

| | | | | |
|---|---|---|---|---|
| 11,676,226 | B1 * | 6/2023 | Hailey .................. | G06T 7/0002<br>705/35 |
| 12,118,481 | B2 * | 10/2024 | Camargo ........... | G07C 9/00896 |
| 2023/0401274 | A1 * | 12/2023 | Denninghoff ...... | G06Q 30/0251 |

* cited by examiner

MULTICOLINEARITY

PRIORITY

This application claims the benefit of priority to U.S. Provisional Patent Application Ser. No. 63/528,349, filed Jul. 21, 2023, which is incorporated by reference herein in its entirety.

BACKGROUND

Online booking systems include data analysis and data manipulation systems that are used to review, for example, booking data to make informed decisions before purchasing a good or service. Improved data analysis and manipulation systems increase overall performance and the reach of such online booking systems.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
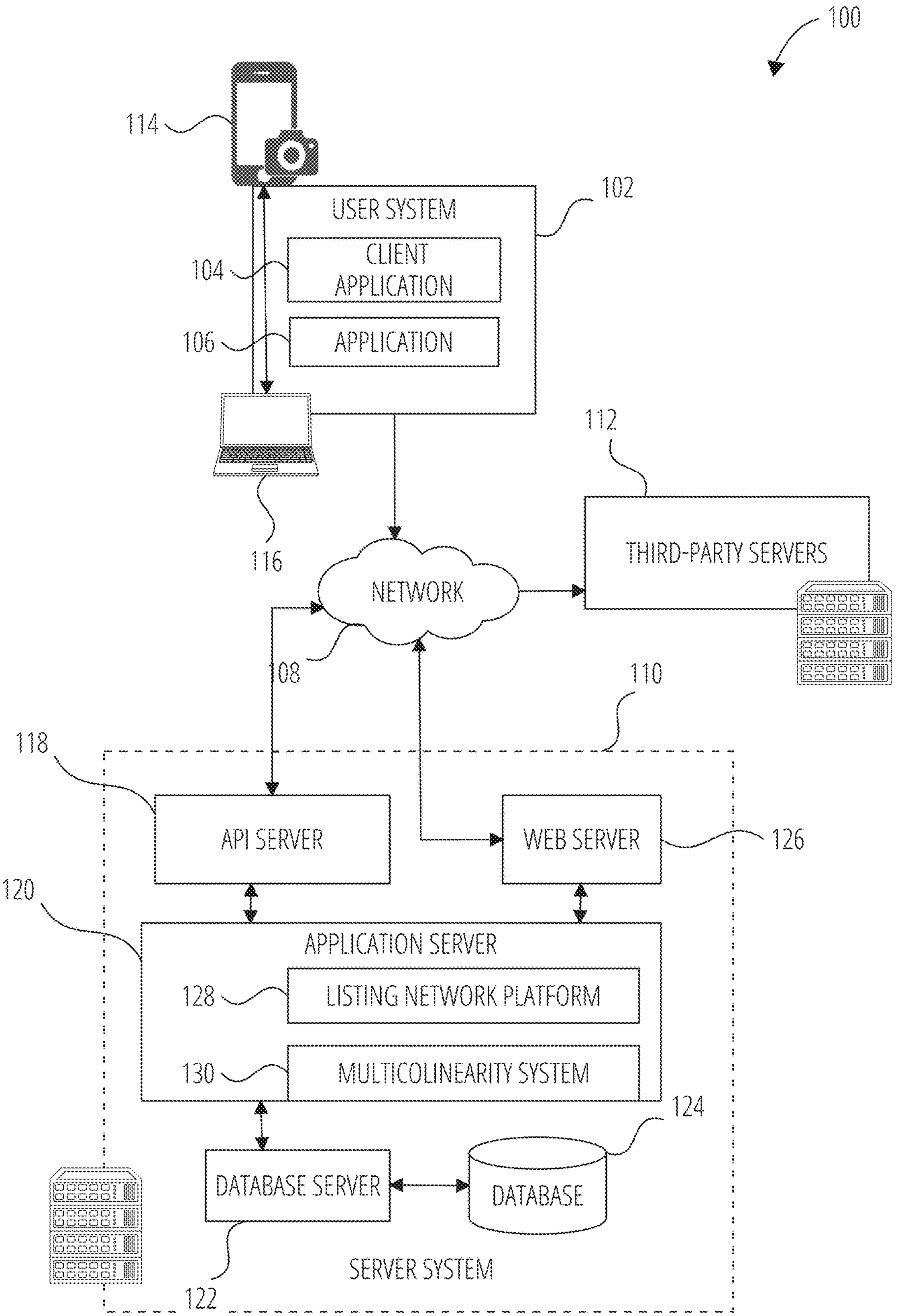
FIG. 1 is a diagrammatic representation of a networked environment in which the present disclosure may be deployed, according to some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Business inquiries frequently revolve around causal inference, for example, seeking to understand the impact of particular business decisions on systems such as a listing network platform. To address such questions, three approaches employed include A/B testing, quasi-experimentation, and observational causal inference methods. While A/B testing and quasi-experimentation are often preferred due to their ability to provide exogenous variation for identification, their implementation can be less efficient and more costly or subject to biases resulting from business or technical constraints. Observational causal inference methods, such as matching methods, synthetic control, and double machine learning, can be used to mitigate biases but usually are not applicable to certain data properties and questions. Furthermore, the aforementioned approaches are more effective in measuring the causal impact of single interventions rather than attributing causal impact holistically across multiple interconnected factors that may contribute to the final outcome. In such scenarios, regression approaches become the alternative. Regression methods use aggregated panel data to concurrently identify the causal impact of multiple factors. However, two challenges undermine the ability to confidently affirm that the estimated parameters from regression methods represent the true causal impact. These challenges are the existence of confounding factors and multicollinearity among covariates. While common solutions such as shrinkage estimators, principal component regressions, and partial linear regressions are helpful in prediction problems, certain limitations hinder their applicability to causal inference problems-they cannot provide the original causal relationships.

The techniques described herein provide a novel approach that specifically addresses the second challenge, namely multicollinearity. To illustrate a practical application of the techniques described herein, an implementation in a marketing measurement scenario (Marketing Mix Marketing-MMM) within the context of a listing network platform is further described below. In marketing contexts, one question of importance is to causally attribute sales to spend across channels-such as Google™ Search, YouTube™ Display, and so on. However, advertisers often allocate their expenditures across ad channels in a correlated manner, particularly during peak seasons. When attempting to estimate impacts via a regression model, highly correlated variables result in larger estimate variances and imprecise attribution of channel contributions, for example, to sales. It is not uncommon to observe regression coefficients switching signs when highly correlated inputs are introduced, consequently undermining the confidence of business stakeholders in the model's results.

As further described below, access to panel data consisting of ad impressions (e.g., number of times an advert is displayed) categorized by channel and geographical location (e.g., Designated Market Area or DMA) over a specific time period is analyzed using certain techniques. When analyzing the data by pooling all geographical locations together, a high level of cross-channel correlation is observed. However, it is worth noting that certain geographical locations exhibit higher cross-channel correlations compared to others. To address the issue of multicollinearity, the techniques describe herein leverage the variations in correlation patterns across different geographical locations. The objective is to restructure the data in a way that significantly reduces the multicollinearity problem. In certain examples, systems and methods involve utilizing hierarchical clustering to group the geographical locations based on their correlation patterns. An important aspect of this approach lies in defining the distance metric used in the clustering algorithm. In the described novel techniques, the distance between two DMAs is defined as the sum of channel-specific distances. Each channel-specific distance measures the similarity in the cross-channel correlation between the two geographical locations.

By incorporating this distance metric (e.g., sum of channel-specific distances) into the hierarchical clustering process, the DMAs can be more effectively grouped in a manner that minimizes multicollinearity across channels. The hierarchical clustering approach allows for an improved practical application of certain models (e.g., marketing measurement models) that mitigates the challenges posed by multicollinearity. Accordingly, improvements in the understanding of the causal relationships between channels and more accurately attribution of their impact on sales or other relevant outcomes is realized. Illustrated improvement with both data descriptive results and regression results are provided herein.

Networked Computing Environment

FIG. 1 is a block diagram showing an example networked system 100 for facilitating listing services, such as publishing goods or services for sale or barter, purchases of goods or services and so forth, over a network. The networked system 100 includes multiple user systems 102, each of which hosts multiple applications, including a client application 104 and other applications 106. Each client application 104 is communicatively coupled, via one or more communication networks including a network 108 (e.g., the Internet), to other instances of the client application 104 (e.g., hosted on respective other user systems 102), a server system 110 and third-party servers 112). A client application 104 can also communicate with locally hosted applications 106 using Applications Program Interfaces (APIs).

Each user system 102 can include multiple user devices, such as a mobile device 114 and a computer client device 116 that are communicatively connected to exchange data and messages.

A client application 104 interacts with other client applications 104 and with the server system 110 via the network 108. The data exchanged between the client applications 104 and between the client applications 104 and the server system 110 includes functions (e.g., commands to invoke functions) and payload data (e.g., text, audio, video, or other multimedia data).

In some example embodiments, the client application 104 is a reservation application for temporary stays or experiences at hotels, motels, or residences managed by other end users, such as a posting end user who owns a home and rents out the entire home or a private room in the home. In some implementations, the client application 104 includes various components operable to present information to the user and communicate with the networked system 102. In some embodiments, if the reservation application is included in the client device 110, then this application is configured to locally provide the user interface and at least some of the functionalities with the application configured to communicate with the networked system 102, on an as-needed basis, for data or processing capabilities not locally available (e.g., access to a database of items available for sale, to authenticate a user, to verify a method of payment). Conversely, if the reservation application is not included in the client device 110, the client device 110 can use its web browser to access the e-commerce site (or a variant thereof) hosted on the networked system 102.

The server system 110 provides server-side functionality via the network 108 to the client applications 104. While certain functions of the networked system 100 are described herein as being performed by either a client application 104 or by the server system 110, the location of certain functionality either within the client application 104 or the server system 110 may be a design choice. For example, it may be technically preferable to initially deploy particular technology and functionality within the server system 110 but to later migrate this technology and functionality to the client application 104 where a user system 102 has sufficient processing capacity.

The server system 110 supports various services and operations that are provided to the client application 104. Such operations include transmitting data to, receiving data from, and processing data generated by the client applications 104. This data can include message content, client device information, geolocation information, reservation information, transaction information, message content. Data exchanges within the networked system 100 are invoked and controlled through functions available via user interfaces (UIs) of the client application 104.

Turning now specifically to the server system 110, an Application Program Interface (API) server 118 is coupled to and provides programmatic interfaces to application server 120, making the functions of the application server 120 accessible to the client application 104, other applications 106 and third-party server 112. The application server 120 are communicatively coupled to a database server 122, facilitating access to a database 124 that stores data associated with interactions processed by the application server 120. Similarly, a web server 126 is coupled to the application server 120 and provides web-based interfaces to the application server 120. To this end, the web server 126 processes incoming network requests over the Hypertext Transfer Protocol (HTTP) and several other related protocols.

The Application Program Interface (API) server 118 receives and transmits interaction data (e.g., commands and message payloads) between the application server 120 and the user systems 102 (and, for example, interaction clients 104 and other application 106) and the third-party server 112. Specifically, the Application Program Interface (API) server 118 provides a set of interfaces (e.g., routines and protocols) that can be called or queried by the client application 104 and other applications 106 to invoke functionality of the application server 120. The Application Program Interface (API) server 118 exposes various functions supported by the application server 120, including account registration; login functionality.

The application server 120 host the listing network platform 128 and a multicollinearity system 130 each of which comprises one or more modules or applications and each of which can be embodied as hardware, software, firmware, or any combination thereof. The application server 120 is shown to be coupled to a database server 122 that facilitates access to one or more information storage repositories or database(s) 124.

The listing network platform 128 provides a number of publication functions and listing services to the users who access the networked system 100. While the listing network platform 128 is shown in FIG. 1 to form part of the networked system 100, it will be appreciated that, in alternative embodiments, the listing network platform 128 may form part of a web service that is separate and distinct from the networked system 100. The listing network platform 128 can be hosted on dedicated or shared server machines that are communicatively coupled to enable communications between server machines. The listing network platform 128 provides a number of publishing and listing mechanisms whereby a seller (also referred to as a "first user," posting user, host) may list (or publish information concerning) goods or services for sale or barter, a buyer (also referred to as a "second user," searching user, guest) can express interest in or indicate a desire to purchase or barter such goods or services, and a transaction (such as a trade) may be completed pertaining to the goods or services.

The multicollinearity system 130 uses certain techniques, such as hierarchical clustering and distance metrics, to reduce multicollinearity and to derive causal relationships between certain products and their users and sales. For example, anonymized listing data collected via the listing network platform 128 is analyzed via the multicollinearity system 130 resulting in practical applications, such as systems and methods, that improve the listing network platform's engagement by increasing a number of users and impression impacts. For example, marketing products and services can now be more easily tracked to determine their impact on the listing network platform 128. Further details of the multicollinearity system 130 are described below.

Bayesian Structural Model Formulation

The techniques described herein include a solution for the multicollinearity problem described above, by using hierarchical clustering. Hierarchical clustering data sets are then applied to an industry standard formulation of Marketing Mix Modeling (MMM), for example, by using Google's light weight MMM model structure with constrained Marketing Channels. Marketing channels include a variety of advertising distribution systems, such as a television channel, a social network platform, a website, a mobile application, and so on. A marketing or media channel is provided in one or more Designated Market Areas (DMAs), such as a geographic location. That is, a country, such as the United States, is split into various contiguous but non-overlapping geographic units or regions, such as cities or metro areas. In certain examples, a standard list of DMAs is used, such as the Nielsen ranking DMAs, which include a listing approximately 210 DMAs.

Model Setup-Sales y are modeled as a nonlinear function of seasonality and advertisement impressions of each channel k with a Bayesian Model shown in Equation 1 below. Let g denote a DMA from a list of DMAs, and t=1, . . . , where t denotes time, (weekly data points are used in the examples below).

$$y_{g,t} = \mu t^{\gamma} + \text{seasonality}_{g,t} + \alpha Z_{g,t} + \beta \sum_{k=1}^{k} \text{AdStock } (x_{g,t}) + \epsilon_{g,t} \quad \text{Equation 1}$$

where g is a geographic unit in the plurality of geographic units, t is a unit of time, k is an advertising channel in the plurality of advertising channels, $\mu t^{\gamma}$ is the sales trend at time t (e.g., sales trend for all channels), $\text{seasonality}_{g,t}$ is a seasonal effect for geographic unit g at time t, α is a correlation coefficient, $Z_{g,t}$ is a covariate variable for g at time t, β is a channel specific impact parameter, $x_{g,t}$ is an impression of advertising channel k, at time t, in geographic unit g, AdStock ($x_{g,t}$) is a transformed impression that captures diminishing return, the carryover effect of the impressions, or a combination thereof, and $\epsilon_{g,t}$ is an error for geographic unit g at time t. Accordingly, $y_{g,t}$ corresponds to the response variable at week t, which could be sales or log transformed sales. It is to be noted that $\mu t^{k}$ (e.g., trend), $\text{seasonality}_{g,t}$, and contemporaneous correlation with covariates $Z_{g,t}$ are included to capture the evolution of organic sales over time. AdStock ($x_{g,t}$) can also be viewed as the transformed impressions that captures: (1) diminishing return; (2) lag of the carryover effect; and (3) carryover effect of the impressions. That is, AdStock ($x_{g,t}$) is the effect of advertising investment over time, also referred to as carryover or the carryover effect. The technique described herein use the AdStock function defined as:

$$\text{AdStock}_{k,g} = \left( \frac{\sum_{l=0}^{L} \tau_k^{(1-\theta_k)^2} x_{t-l,m}}{\sum_{l=0}^{L} \tau_k^{(1-\theta_k)^2}} \right)^{\rho} \quad \text{Equation 2}$$

where L is the total number of weeks, τ is a carryover rate parameter, ρ is a diminishing return to scale, $x_{t-1,m}$ is a media spend at time t−1 for advertising channel m of the plurality of advertising channels, and $\theta_k$ is a delayed realization of impact coefficient for advertising channel k.

Addressing Confounding Factors

Confounding factors that obfuscate or otherwise occlude results are taken into account using the techniques described herein when modeling natural trend and seasonality in order to more properly capture organic demand. When modeling natural trend and seasonality, it is beneficial to strike the right balance between flexibility and strictness—excessive flexibility may lead to overfitting in the model, whereas overly rigid parametric formulations can result in a poor fit of the model. In a marketing use case, a model can be easily overfit that performs poorly out of sample (e.g., outside of training data) because of a high dimensional parameters space, such as estimating four parameters per channel g. Keeping this tradeoff in mind, in addition to including exponential trend and sinusoidal seasonality, including as an additional covariate an index of search (e.g., internet search) query volume for travel and accommodation brands excluding some listing sites (e.g., listing network platform 128 which is represented by $Z_{g,t}$ in the above equation $y_{g,t}$), is beneficial to capture confounding factors that affect organic demand contemporaneously.

Data Properties and Processing

Pre-process data-Two steps are taken to pre-process data in preparation for descriptive analysis and modeling. First is a normalization step. For example, bookings, channel impressions, and a desired covariate are normalized to establish a common scale across DMAs of different sizes. Normalization is a statistical technique used to adjust diverse data points to a common scale, making them comparable without distorting differences in the range of values or losing information. There are several methods to normalize data, such as Min-Max scaling, Z-score normalization or standardization, and unit vector normalization. Min-Max scaling rescales a feature to a fixed range, usually 0 to 1. Z-score normalization or standardization involves rescaling the data to have a mean (average) of 0 and a standard deviation of 1. Unit vector normalization scales the data such that the length of the vector of the data points (in multi-dimensional space) is 1. It is often used in text classification and clustering. This will make it easier to interpret the impact of a certain level of marketing activity, and to model a common trend and seasonality later. Second, channel impressions are decomposed into the common trend, the seasonality, and a residual variation across DMAs so that there is a focus on correlation in the residual variation.

In the context of statistical analysis, particularly in time series data like channel impressions across different Designated Market Areas (DMAs), "decomposed" refers to the process of breaking down the observed data into distinct components that each represent underlying patterns or influences in the data. This decomposition typically includes the common trend, seasonality, and residual variation. Common Trend: This component captures the long-term progression of the data, showing how the channel impressions increase or decrease over time, independent of seasonal fluctuations or irregular occurrences. The trend component is used for understanding the overall direction and growth or decline in channel impressions. Seasonality: This component reflects regular and predictable cycles or patterns that repeat over a specific period, such as weekly, monthly, or annually. In the context of marketing, seasonality might capture increased advertising impressions during holiday seasons, back-to-school periods, or other cyclic events that predictably affect consumer behavior. Residual Variation: After the trend and seasonality are accounted for, the residual variation includes the randomness or irregularities left in the data. These are the fluctuations that cannot be attributed to the systematic trend or seasonal effects. Decomposition can be achieved through various statistical methods depending on the nature of the time series data and the specific requirements of the analysis. For example, Principal Component Analysis (PCA) can be used to decompose the data into several components. PCA is used to reduce the dimensionality of a dataset by transforming it into a new set of variables called principal components. Decomposition can also be achieved via additive decomposition or multiplicative decomposition. Additive decomposition assumes that the components are added together to form the observed data. It's used when seasonal variations are roughly constant through the series. Multiplicative decomposition assumes that the components are multiplied together. It's useful when seasonal variations change proportionally over time.

Figure 2:
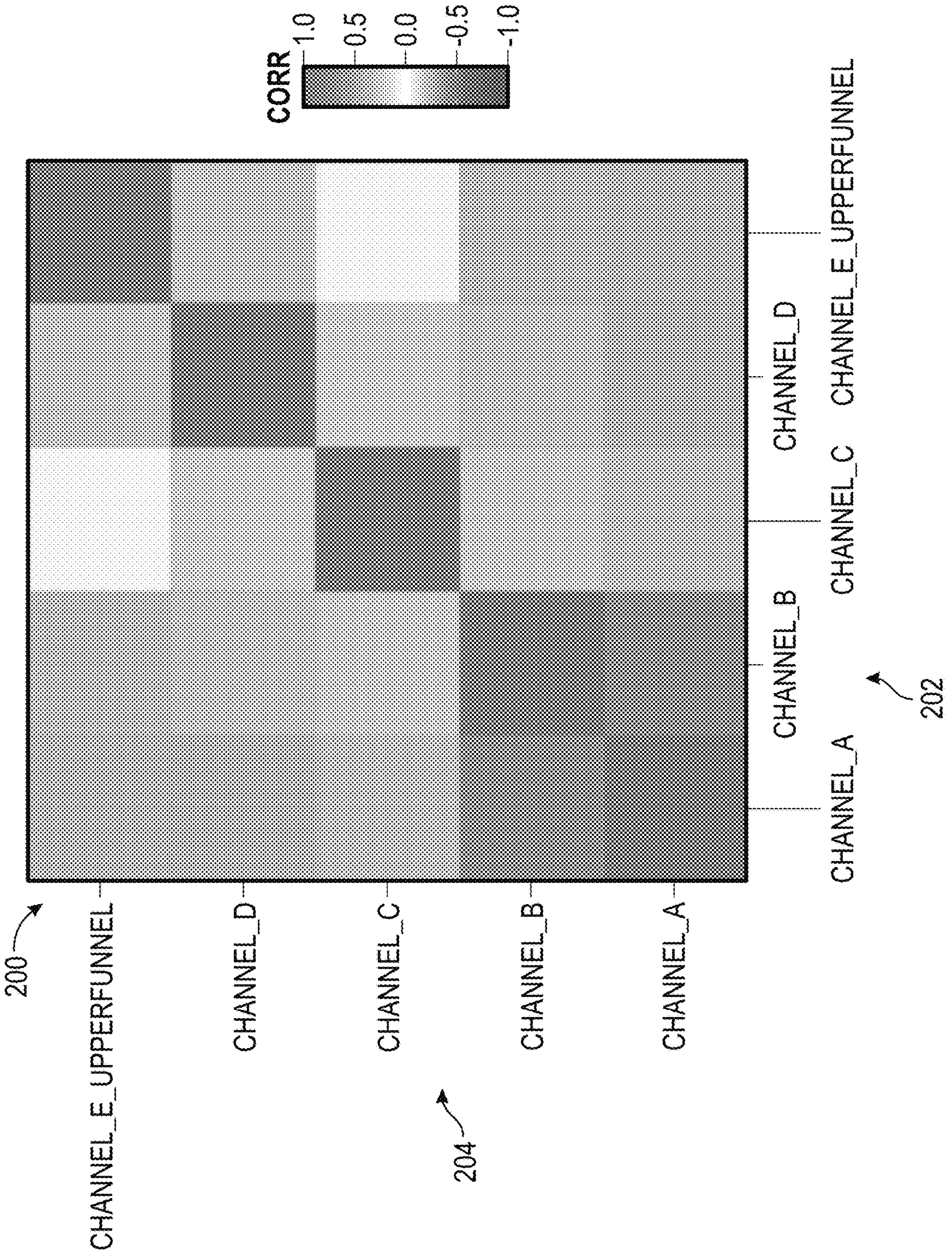
FIG. 2 illustrates a correlation of residual channel impressions graph, according to some examples.

FIG. 2 depicts a matrix graph 200 showing correlations between marketing channels, according to some examples. Certain DMA-level data, such as listing network platform data 128, has correlations pre-existing between marketing channels and DMAs, even after eliminating common trends and seasonality across DMAs for each channel. Trend refers to the long-term movement in the data over time, independent of cyclical and seasonal variations. In marketing data, a trend might show a gradual increase or decrease in sales or advertising impressions due to factors such as increasing brand popularity, market expansion, and/or changes in consumer behavior over several years. Seasonality refers to periodic fluctuations that regularly occur in marketing data, typically within a one-year period. These fluctuations are driven by events or patterns that repeat around the same time each year, such as holidays, school seasons, and/or weather changes.

Both a horizontal and vertical axes 202, 204, respectively, list the advertising channels, which are anonymized and labeled as channel a, channel b, channel c, channel e, and channel e (referred to as "channel_e_upperfunnel" in the figure). Each cell in the matrix shows the correlation coefficient between the channels specified by the corresponding row and column. The coefficients range from −1.0 to 1.0, where: 1.0 indicates a perfect positive correlation; 0.0 indicates no correlation; −1.0 indicates a perfect negative correlation. In some examples the cells are color-coded to visually emphasize the strength and direction of the correlation. For example, cells can be shaded more intensely for higher absolute values of correlation, with different colors representing positive and negative correlations. As graph 200 in FIG. 2 shows, the variation in residual impressions of the anonymized channel data is moderately to strongly correlated across different channels. Such correlation is more pronounced across some DMAs than other DMAs. This correlation leads to multicollinearity, which will obfuscate an analysis such as that employed via MMM. Indeed, multicollinearity complicates the analysis by making it difficult to separate the individual effects of each channel on the outcome variable (e.g., sales).

Figure 3A:
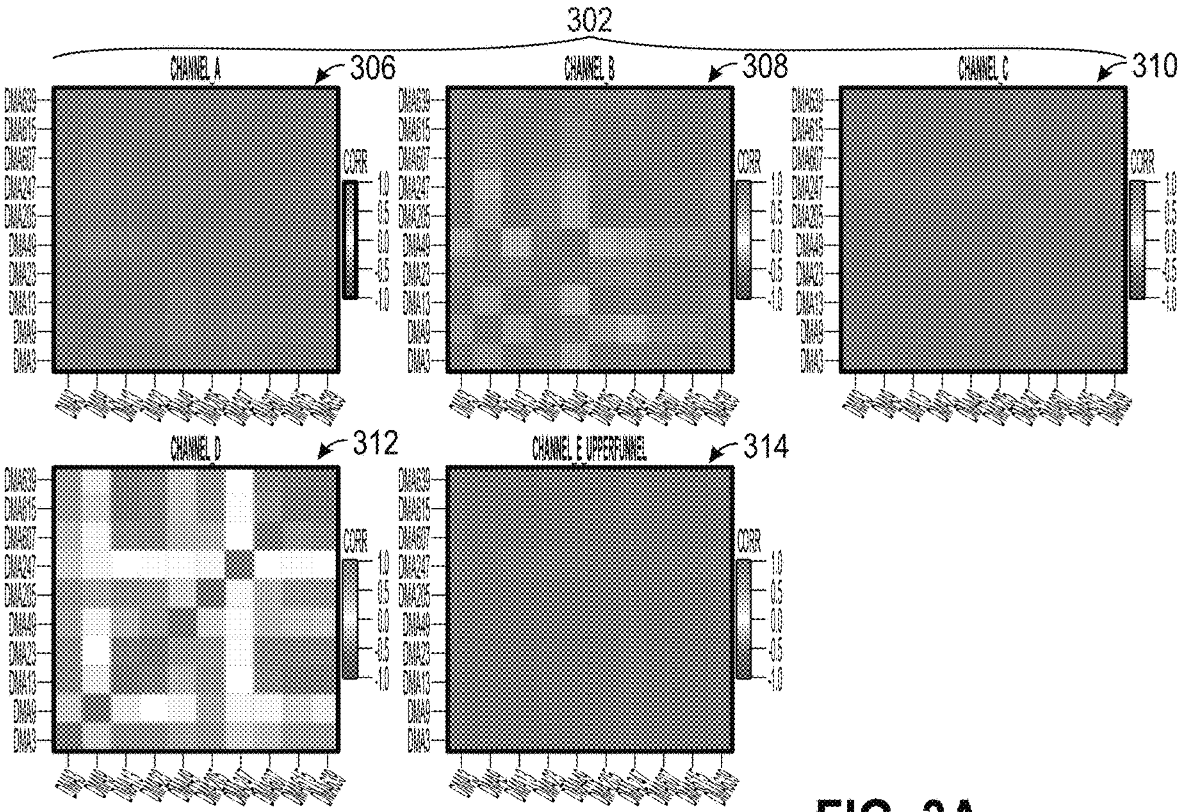
FIG. 3A illustrates a first set of designated market areas, according to some examples.
Figure 3B:
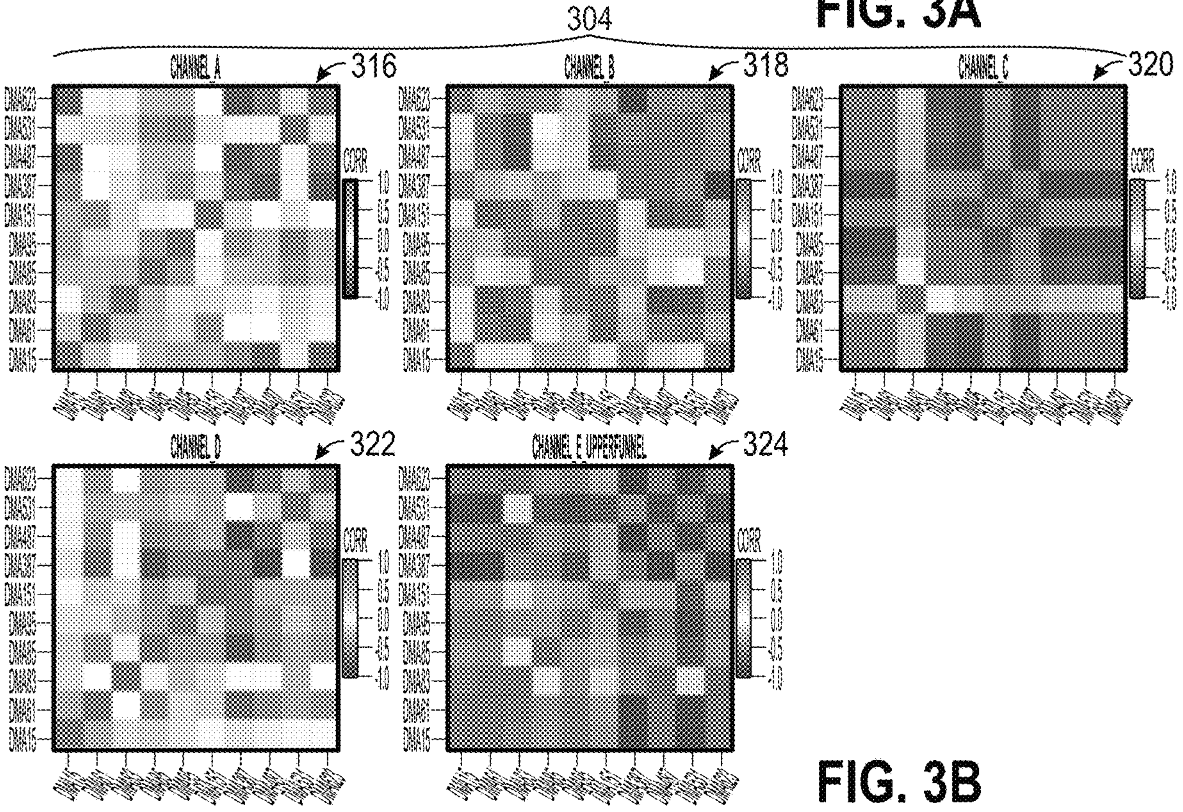
FIG. 3B illustrates a second set of designated market areas, according to some examples.

FIG. 3A and FIG. 3B compares two sets of DMAs 302 and 304, according to some examples. More specifically, FIG. 3A shows matrix graphs 306, 308, 310, 312, and 314 for a set X of DMAs 302 while FIG. 3B shows matrix graphs 316, 318, 320, 322, 324 for a set Y of DMAs 304. In the depicted example, set X has different DMAs than set Y. That is, DMAs 302 are different DMAs than DMAs 304. Each of the depicted graphs 306, 308, 310, 312, 314, 316, 318, 320, 322, 324 includes a horizontal axis representing different DMAs, which are anonymized and labeled with codes like dma639, dma615, dma607, and so on, and a vertical axis lists the advertising channels, similar to FIG. 2, including channels like channel a, channel b, channel c, channel c, and channel e (referred to as "channel_e_upperfunnel"). Each cell in the graphs 306, 308, 310, 312, 314, 316, 318, 320, 322, 324 shows the correlation coefficient between the advertising channels for specific DMAs. The coefficients range from 1.0 to −1.0, indicating varying degrees of correlation.

DMAs 302 are in the Xth ventile of baseline sales and exhibit extremely high correlation for four out of the five marketing channels. For example, graphs 306, 308, 310, and 314 representative of channels A, B, C, and E respectively, show very high correlation across all DMAs while only graph 312 representative of channel D shows a mix of low to high correlation across DMAs. DMAs 304 in the Yth ventile exhibit relatively little correlation for all channels. That is, all graphs 316, 318, 320, 322, and 324 show non-uniform coloration across cells. Accordingly, FIGS. 3A and 3B illustrate how the degree of multicollinearity varies across different geographical segments. The techniques described herein reduce multicollinearity by clustering together DMAs with similar advertising spend patterns, thereby facilitating more reliable regression analysis and better isolation of the effects of different marketing channels on outcomes like sales. In some examples, DMAs are clustered using hierarchical clustering based on distance metrics.

Hierarchical Clustering as a Solution to Multicollinearity

Multicollinearity poses a challenge in separately measuring the impact of different marketing channels. While common solutions such as shrinkage estimators, principal component regressions, and partial linear regression are helpful in prediction problems, a limitation hinders their applicability to causal inference problems-they typically cannot provide the original causal relationships for business interpretability. To help overcome this limitation, the techniques described herein use a distance metric, such as a pairwise distance metric, that defines correlation-based distances between DMAs. The distance metric is then used to build hierarchically clusters of geo-graphical areas in a way that more effectively mitigates cross-channel multicollinearity. In certain examples, the distance metric includes a pairwise distance or dissimilarity metric that is calculated to summarize marketing spend correlation between DMAs. That pairwise metric is used to cluster the DMAs having moderate to strong correlation.

Figure 4:
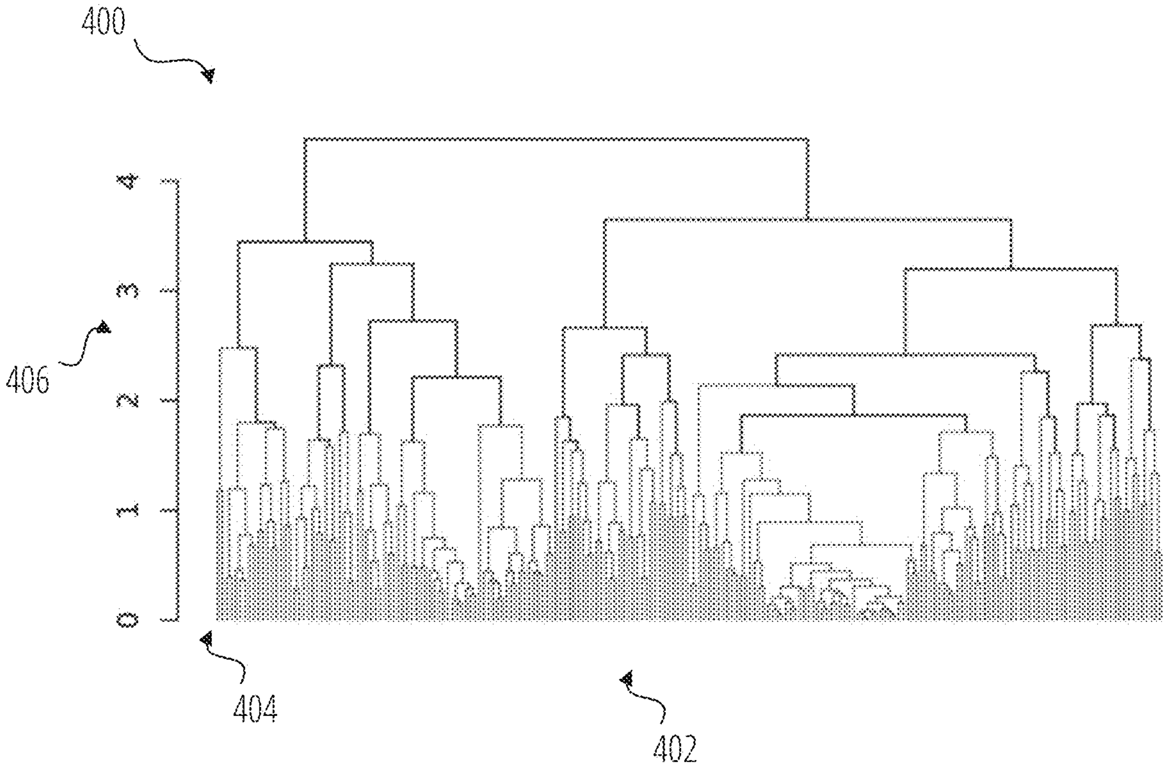
FIG. 4 illustrates a dendrogram showing hierarchical clustering, according to some examples.

Turning now to FIG. 4, the figure depicts a dendrogram 400, according to some examples. As noted above, a distance metric is used to hierarchically cluster certain geolocations, such as DMAs, and the dendrogram 400 depicts an example hierarchical clustering. In some examples, the equations below are used to calculate a pairwise distance metric $\text{Distance}_{ij}$ used for hierarchical clustering of DMAs.

$$\text{Distance}_{ijk} = 1 - \text{Correlation}\ (X_{ik}, X_{jk}) \qquad \text{Equation 3}$$

$\text{Distance}_{ijk}$ is a pairwise channel-based distance metric that calculates, for each channel k, a distance between two DMAs i and j, where $X_{ik}$ denotes the time series of residual impressions after eliminating common trend and seasonality, for channel k in DMA i. Calculating an overall distance across all channels is then done using the $\text{Distance}_{ijk}$ formula above. More specifically, the overall distance across all channels is the square-root of the sum of squared distances across the channels, and is referred to as $\text{Distance}_{ij}$. $\text{Distance}_{ij}$ is a measure that reflects correlation between DMAs across multiple channels, while Correlation ($X_{ik}$, $X_{jk}$) is a statistical correlation coefficient between $X_{ik}$ and $X_{jk}$, such as a Pearson correlation coefficient. An equation to calculate $\text{Distance}_{ij}$ is below.

$$\text{Distance}_{ij} = \sqrt{\sum_{k=1}^{K} \text{Distance}_{ijk}^2} \qquad \text{Equation 4}$$

An example complete-linkage hierarchical clustering algorithm used to hierarchically cluster DMAs based on $\text{Distance}_{ij}$ is as follows:

(1) Start with assigning each DMA to its own cluster;

(2) Then proceed iteratively, joining the two most similar clusters at each step, continuing until there is just a single cluster.

Distance or dissimilarity between two clusters is based on the farthest pair as calculated via $\text{Distance}_{ij}$. This algorithm produces the dendrogram 400 in FIG. 4, which illustrates how DMAs are clustered at each step.

More specifically, FIG. 4 includes a horizontal axis having all of the DMAs listed from 1 to N, where DMA 1 is an origin 404. As mentioned earlier, each DMA is placed inside its own cluster, so there are N clusters at level 0 of a horizontal axis 406. Next, a second clustering step occurs, where all the clusters now have at least two DMAs, and the DMAs in each cluster have the most similar $\text{Distance}_{ij}$. That is, DMAs having the smallest $\text{Distance}_{ij}$ between them are merged into a single cluster. This process is repeated, progressively reducing the number of clusters and increasing the distance at which clusters are combined. As you move up the dendrogram 400, branches merge together, indicating the grouping of DMAs into clusters based on their $\text{Distance}_{ij}$ similarity. This algorithm offers a lot of flexibility in how aggressively it is desired to cluster DMAs or how many clusters to have—one can pick any cutoff distance between 0 (e.g., each DMA in a separate cluster) and 4 (e.g., all DMAs in one cluster).

A cutoff distance can be chosen to determine the number of clusters to retain. For example, cutting the dendrogram 400 at a specific height will define the clusters that are used in subsequent analysis. The cutoff distance is chosen to correspond to a desired correlation threshold, thus providing that DMAs within the same cluster have a moderate to strong correlation. In one non-limiting example for demonstration purposes, a cutoff distance of 1.5 is used herein, which corresponds to correlation of at least 0.33 on average for each channel and produces 42 clusters out of 210 or so Nielsen DMAs. Accordingly, DMAs are grouped so that they feature moderate to strong correlation into the same cluster.

Figure 5:
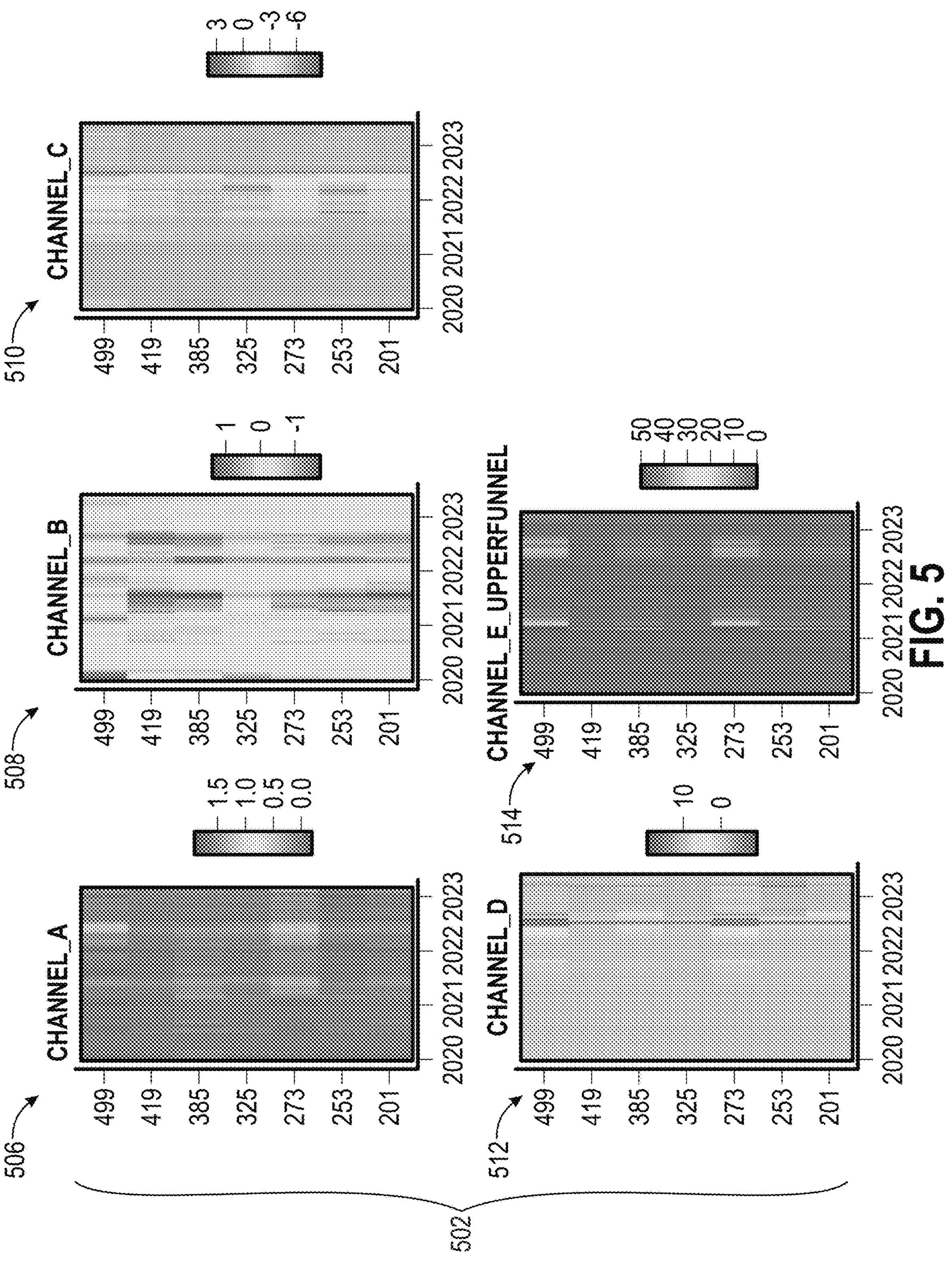
FIG. 5 illustrates a small hierarchical cluster subject matter, according to some examples.
Figure 6:
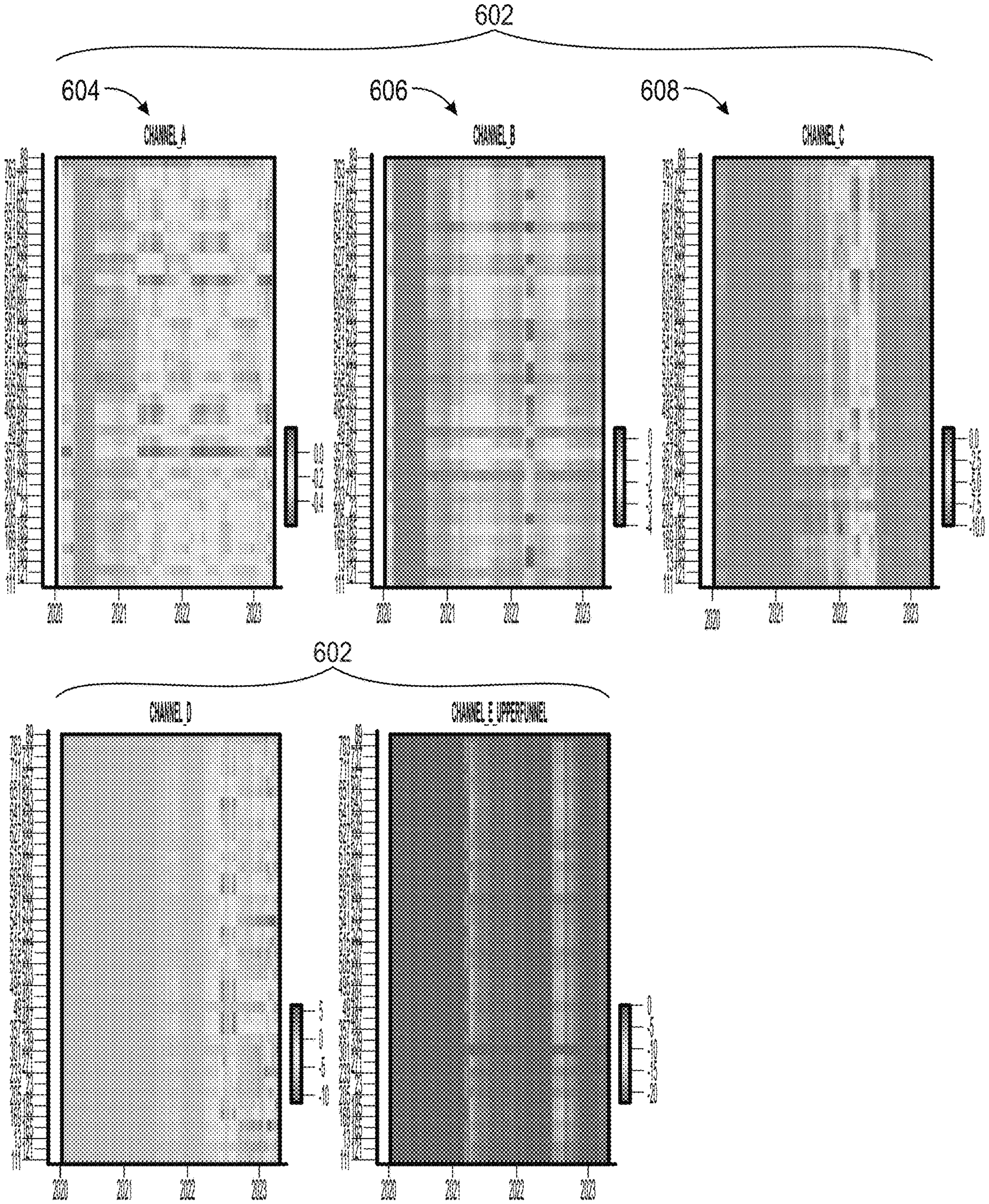
FIG. 6 illustrates a larger hierarchical cluster when compared to FIG. 5, according to some examples.

The hierarchical clustering approach, e.g., via DMA's $\text{Distance}_{ij}$, produces more intuitive results. It would be beneficial to visualize channel impressions over time across DMAs within each cluster, confirming that DMAs within the same cluster tend to have highly correlated impressions over time for at least some channels. FIG. 5 exemplifies such patterns using one small cluster 502, while FIG. 6 illustrates one larger cluster 602, according to some examples. More specifically, FIG. 5 is organized as a series of heat maps 506, 508, 510, 512, 514, one for each advertising channel (e.g., channel a, channel b, channel c, channel d, channel c) for a cluster having 7 DMAs. Each heat map 506, 508, 510, 512, 514 displays data for a specific channel as it varies over time across the 7 DMAs that are part of a cluster, such as cluster 1.

Each heat map 506, 508, 510, 512, 514 includes a horizontal axis representing time, with the depicted examples spanning several years (e.g., 2020 to 2023). This horizontal axis shows how the channel impressions change over time for a given channel. Each heat map 506, 508, 510, 512, 514 also includes a vertical axis representing different DMAs within a given cluster, e.g., cluster 1. Each row in a heat map corresponds to a specific DMA, showing a pattern of impressions for that DMA over the specified time period. The heat maps 506, 508, 510, 512, 514 use color to represent the intensity or volume of channel impressions. The scale might range from low (e.g., cooler colors like blue) to high (e.g., warmer colors like red). Consistency in color across a single row indicates stability or similarity in advertising impressions for that DMA over time. Variations in color might indicate fluctuations in advertising activity.

In the depicted embodiment, channel b, represented by heatmap 508, shows that compared to the other channels a, c, d, e, channel b is more dissimilar in impressions. This heatmap visualization helps in visualizing and analyzing the consistency and variability of advertising impressions across different channels and DMAs within cluster 1. It aids in understanding how clustered DMAs behave in terms of advertising over time.

Similar to FIG. 5, FIG. 6 illustrates heat maps 604, 606, 608, 610, 612, according to some examples. In the depicted example, heat maps 604, 606, 608, 610, 612 are representative of the advertising channels a, channel b, channel c, channel d, channel e, respectively, for a cluster having 40 DMAs. Each heat map 604, 606, 608, 610, 612 displays data for a specific channel as it varies over time across the 40 DMAs that are part of the cluster, such as cluster 4.

Each heat map 604, 606, 608, 610, 612 includes a horizontal axis representing time, with the depicted examples spanning several years (e.g., 2020 to 2023). This horizontal axis shows how the channel impressions change over time for a given channel. Each heat map 604, 606, 608, 610, 612 also includes a vertical axis representing different DMAs within a given cluster, e.g., cluster 4. Each row in a heat map corresponds to a specific DMA, showing a pattern of impressions for that DMA over the specified time period. The heat maps 604, 606, 608, 610, 612 also use color to represent the intensity or volume of channel impressions. The scale might range from low (e.g., cooler colors like blue) to high (e.g., warmer colors like red). Consistency in color across a single row indicates stability or similarity in advertising impressions for that DMA over time. Variations in color might indicate fluctuations in advertising activity.

In the depicted embodiment, channel a, represented by heatmap 604, shows that compared to the other channels b, c, d, e, channel a is more dissimilar in impressions for cluster 4. By examining each channel separately, stakeholders can assess which channels are more consistently utilized across DMAs within a cluster and which channels exhibit more variability. This detailed view confirms the effectiveness of the approach in clustering DMAs that share similar patterns in marketing activities over time across different channels. As shown in FIGS. 5 and 6, the hierarchical clustering technique described herein not only groups DMAs into clusters that have mostly similar impressions in the various advertising channels, but also provides visualizations, such as the heat maps 506, 508, 510, 512, 514, 604, 606, 608, 610, 612 that can be displayed, for example, via a graphical user interface provided by the web server 126 and/or the user system 102, that graphically illustrate how each cluster has been grouped and the results (e.g., pairwise distance) per channel over time.

Figure 7:
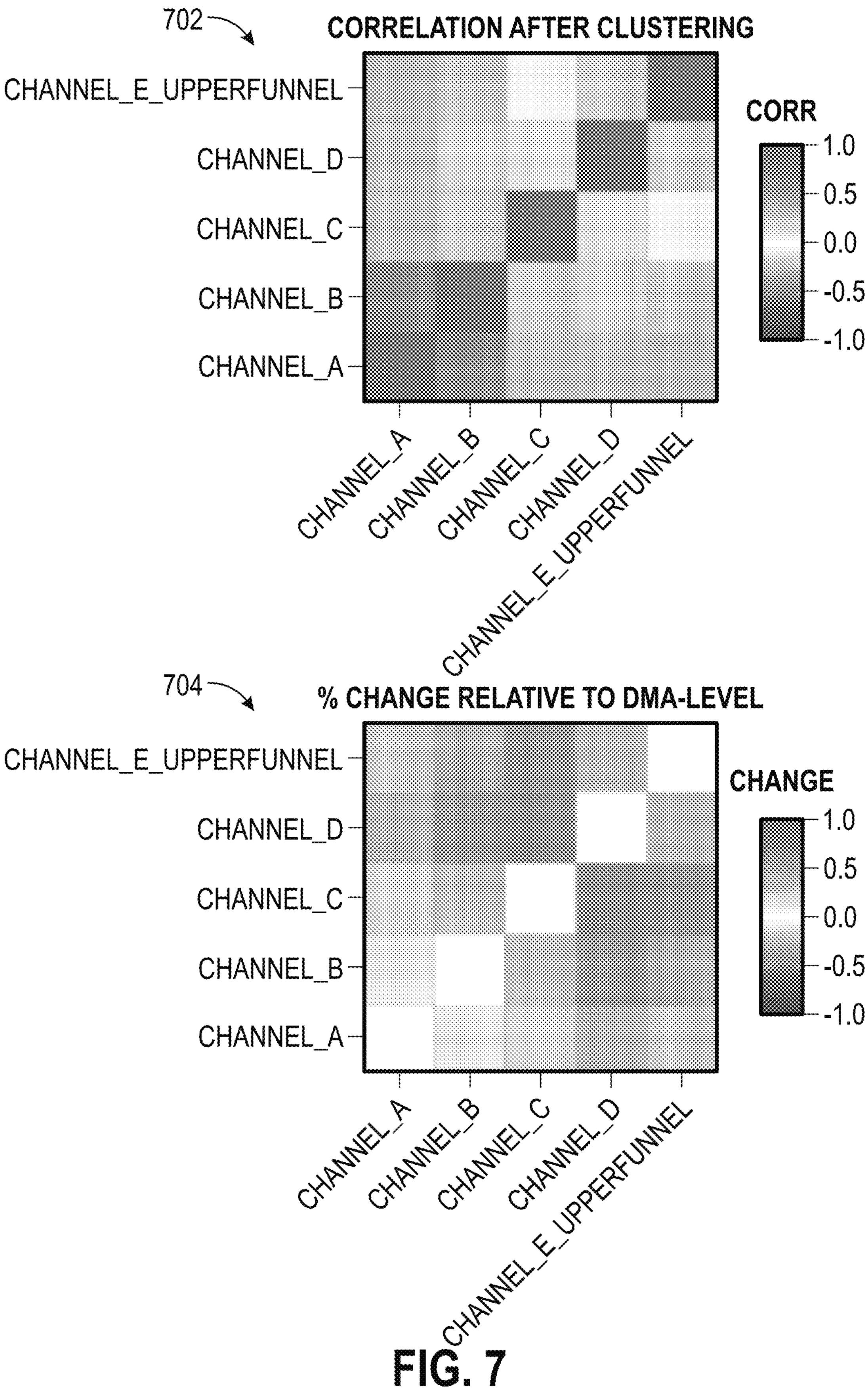
FIG. 7 illustrates a first graph showing correlation after clustering and a second graph showing a percent change relative to designated market area levels, according to some examples.

FIG. 7 illustrates a graph 702 showing correlation after clustering and a graph 704 showing a percent change relative to DMA-level. As illustrated, graphs 702, 704, show reduced multicollinearity after the clustering. More specifically, graph 702 shows a correlation matrix of advertising channels after clustering. This matrix displays the correlation coefficients between each pair of channels similar to FIG. 2 above. As illustrated, graph 702 shows correlations pre-existing between marketing channels and DMAs after eliminating common trends and seasonality across DMAs for each channel. That is, cells of the graph 702 show as having colors above 0, and in many cases, approaching 1, indicative of high correlation. Graph 704 shows a percentage change relative to DMA-level or the percentage of the reduction in multicollinearity. Darker colors in graph 704 correspond with a higher reduction (e.g., percent change) in collinearity. By visualizing the two graphs 702, 704, users can now assess how the clustering has affected the correlations between channels. Ideally, after clustering, graph 704 should show reduced off-diagonal values, indicating less multicollinearity. It is to be noted that both graphs 702, 704 are provided, in some examples, via the web server 126 and/or the user system 102 through one or more graphical user interfaces.

Figure 8:
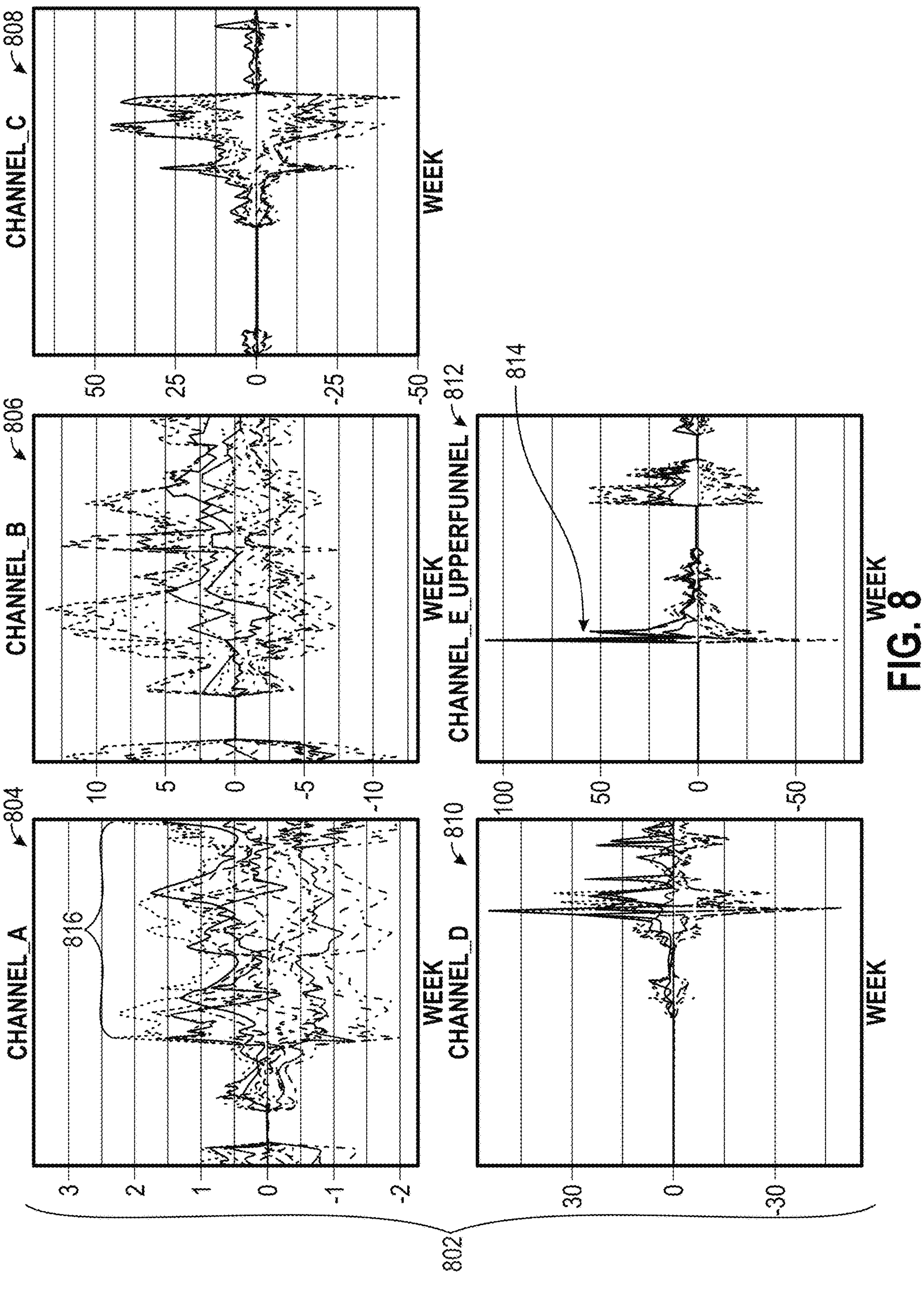
FIG. 8 illustrates various graphs of marketing channels, according to some examples.

Further, as FIG. 8 demonstrates via the illustrated channels 802, that there is a significant variation in channel impressions both (A) within clusters over time and (B) across clusters within the same time period, according to some examples. This is promising for separately identifying the impact of different channels using panel data at the cluster-time level, such as cluster-week level. That is, FIG. 8 visually represents the variation in advertising channel impressions across different clusters of Designated Market Areas (DMAs) over time via graphs 804, 806, 808, 810, 812. Each graph 804, 806, 808, 810, 812 includes a horizontal axis representing time, typically spanning several years in weekly increments beginning at week 0. The horizontal axis shows how the residual impressions for the channel change over time. Each graph 804, 806, 808, 810, 812 also includes a vertical axis representing the residual impressions of the advertising channel, which are the impressions adjusted for common trends and seasonality, thus focusing on the unique variations that are not explained by broader factors. Each of the various curves inside of the graphs 804, 806, 808, 810, 812 represents a different cluster after the application of hierarchical clustering.

The curves displayed in the graphs 804, 806, 808, 810, 812 are centered at 0 of the vertical axes via removal of the global average. The curves are then displayed to illustrate the effectiveness of the hierarchical clustering in creating groups (clusters) of DMAs that exhibit similar advertising behaviors. For example, graph 812 shows a spike at week 814 representative of a week of very high impressions for channel e. This may be due to channel e being a television channel and the spike at 814 is when a sports event, such as the Super Bowl, is occurring. In comparison, graph 804 shows a range of weeks 816 with impressions remaining relatively high for channel a. It is to be noted that graphs 804, 806, 808, 810, 812 are provided, in some examples, via the web server 126 and/or the user system 102 through one or more graphical user interfaces.

Panel Regression Results Confirms Clustering Mitigates Multi-Collinearity

Panel linear regression analysis affirms the effectiveness of this hierarchical clustering process in mitigating collinearity and facilitating the separate identification of the impact of different marketing channels. After clustering, channel coefficient estimates, the problem of flipped signs when included together with other channels, is minimized or eliminated, and the clustered data instead produces more intuitive results as shown in Table 1 below.

TABLE 1

Panel Linear Regression Summary

| | DMA Level | Cluster Level | Cluster Level, Weighted |
|---|---|---|---|
| channel_a | 5.570*** | 5.041*** | 5.227*** |
| | (0.075) | (0.149) | (0.146) |
| channel_b | −0.055*** | 0.128*** | 0.097*** |
| | (0.014) | (0.028) | (0.027) |
| channel_c | −0.003 | 0.043*** | 0.038*** |
| | (0.004) | (0.008) | (0.007) |
| channel_d | 0.007 | 0.007 | 0.009 |
| | (0.005) | (0.010) | (0.010) |
| channel_e | −0.011*** | −0.023** | −0.025*** |
| | (0.003) | (0.008) | (0.007) |
| Num. Obs. | 35700 | 7140 | 7140 |
| R2 | 0.862 | 0.946 | 0.946 |
| R2 Adj. | 0.861 | 0.944 | 0.944 |
| AIC | 113008.3 | 34358.7 | 48912.9 |
| BIC | 114492.8 | 35561.6 | 50115.8 |
| RMSE | 1.17 | 2.62 | 7.27 |

+ $p < 0.1$,
* $p < 0.05$,
** $p < 0.01$,
*** $p < 0.001$

Table 1 summarizes panel linear regression results before and after clustering, with geographic (DMA or cluster) fixed effects and week fixed effects included throughout the different specifications. As Column 1 summarizes, most channel coefficients are negative if DMA-level data is used, while the channel coefficients would be positive if included individually. After clustering, in Column 2, the results become mostly intuitive-all four lower-funnel channels have positive estimated impact on sales (three of which are significant at 0.001 level). The remaining channel with a negative coefficient is upper-funnel, where an expected extreme difficulty in detecting a lower funnel impact is found. Finally, these findings are robust to weighting the cluster based on the natural log of their baseline size.

Bayesian Model Results Using Cluster-Level Data

Figure 9:
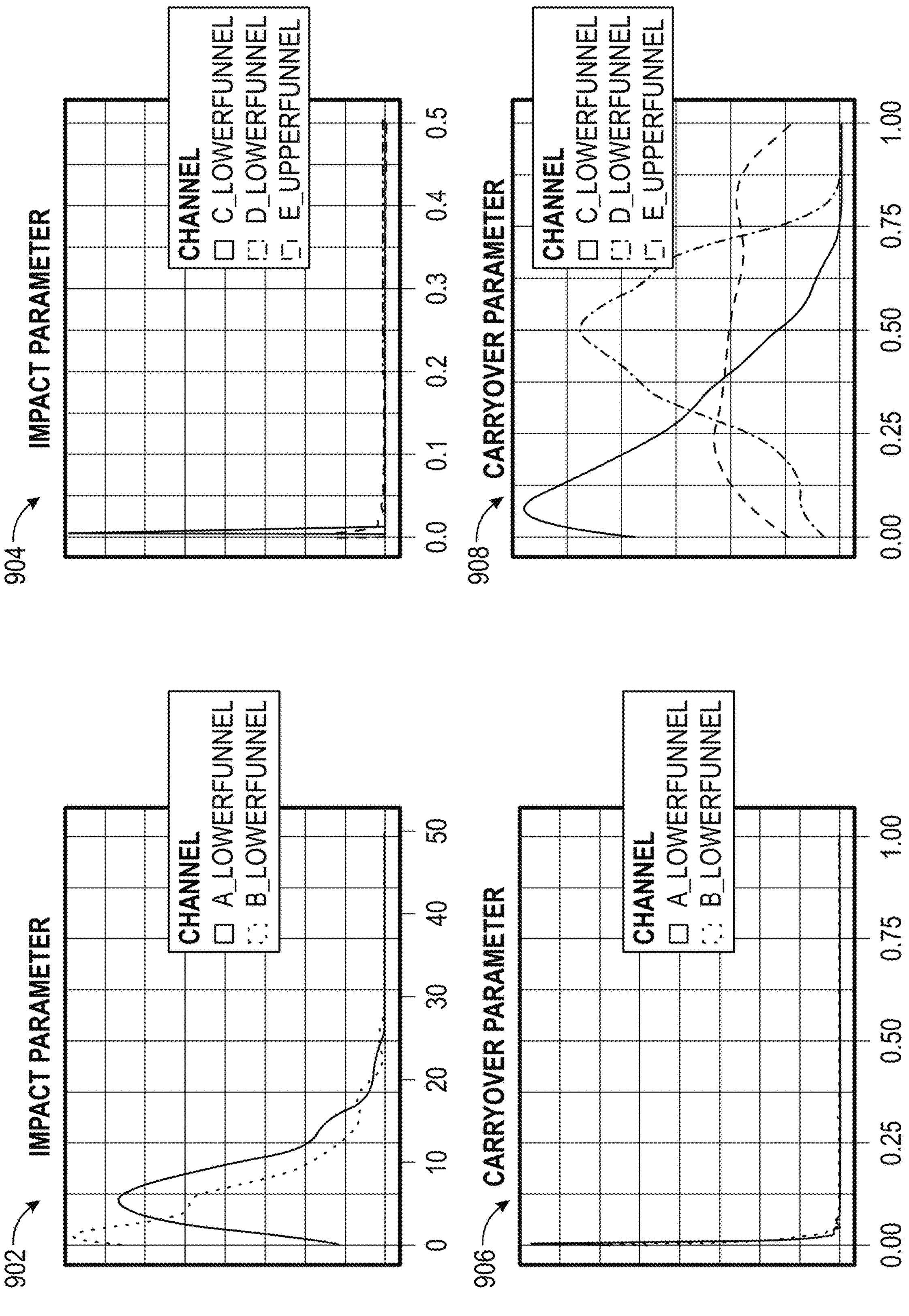
FIG. 9 illustrates via various graphs, a posterior distribution of channel-specific impact parameters (B) and carryover rate parameters (t), according to some examples.

Now that both descriptive evidence and frequentist regression analysis affirm that the hierarchical clustering technique more effectively mitigates collinearity, an estimate of the Bayesian model described above using data at the cluster level is performed. Similar to the frequentist regressions, the Bayesian model also produces intuitive results, even with uninformative priors. FIG. 9 visualizes, via graphs 902, 904, 906, 908, the posterior distribution of channel-specific impact parameters (B) and carryover rate parameters (t). In the depicted example, graphs 902, 904 are impact parameter or impact metric graphs each showing a distribution of the estimated impact metric of each advertising channel on the outcome (e.g., sales). Graph 902 shows the impact of channels a and b, while graph 904 shows the impact of channels c, d, and c. Graphs 902 and 904 include a horizontal axis representing the range of possible values for the impact metric. This horizontal axis is scaled to show the entire range of values that the parameters could take based on the posterior distribution. Graphs 902 and 904 also include a vertical axis representing the density or probability of each parameter value, indicating how likely each value is given the data and the model. An impact metric refers to the immediate effect, such as dollar effect, of an advertising campaign on the target metric, such as sales, brand awareness, or website traffic. It measures the direct response to an advertising stimulus during the period it is active. In regression models or marketing mix modeling, the impact parameter quantifies how much a unit increase in advertising (e.g., an additional 1,000 impressions or an extra $1,000 spent) changes the outcome, such as an increase in sales or conversions.

Likewise, graphs 906, 908 include a horizontal axis representing the range of possible values for a carryover metric. This horizontal axis is also scaled to show the entire range of values that the carryover metric or parameters could take based on the posterior distribution. Graphs 906 and 908 also include a vertical axis representing the density or probability of each metric value, indicating how likely each value (e.g., carryover) is given the data and the model. A carryover metric, also known as lag effects or persistence effects, describe how the influence of an advertising campaign extends beyond the immediate period during which the advertisement is run. This effect acknowledges that consumer behavior might not change instantly but may be influenced over time due to factors like increased brand recognition, improved brand perception, or delayed purchasing decisions.

Consistently with earlier findings, there is an estimate of a higher impact for channels a and b than the other channels, as shown in graph 902, 904. Note that the impact parameter estimates here should be interpreted differently from the frequentist panel linear regressions above, because the Bayesian structural model also estimates parameters that transform the impressions for each channel into adstock based on the lag, carryover, and shape parameters. Broad comparisons of the impact parameter across channels are made, taking into account the other parameters. Furthermore, the carryover estimates are also intuitive and consistent with previous knowledge about the different channels. For example, some carryover for channels c, d, and e is expected, but not for channels a and b, and it is reassuring that the estimates confirm that understanding even when using uninformative priors. It is to be noted that graphs 902, 904, 906, 908 are provided, in some examples, via the web server 126 and/or the user system 102 through one or more graphical user interfaces.

Discussion on Other Applications of Hierarchical Clustering

While focusing on an application in marketing mix modeling to demonstrate how and why hierarchical clustering of geographical areas can reduce multicollinearity is helpful, however, the techniques described herein are not constrained to only the setting of marketing and instead is generally applicable to observational causal inference problems featuring multicollinearity. This section overviews some other areas where the techniques presented herein can be applied to and where the dimension to cluster does not always have to be geographical. For example, in the context of customer service, one would like to understand how customers' interaction with support agents contributes to long term customer retention. Often, however, these interaction experience metrics are highly correlated, such as wait time and abandon rate, and so on. In this case, clustering is leveraged to segment customer issue types into groups that have different degrees of correlation between wait time and abandon rate.

In another example, in the context of pricing and product optimization in any highly differentiated marketplace like listings having a large number of product segments, one often needs to use observational and quasi-experimental data to understand how clastic demand is to prices and how much customers value various product attributes. Among other challenges, different features often exhibit correlation with each other as well as with prices. While there are other solutions such as instrumental variables to this problem, hierarchical clustering is performed in a way that reduces correlation and thus complements existing methods, especially for features or settings where one cannot find valid instruments.

Accordingly, the utilization of clustering as an innovative and effective approach to address the issue of multicollinearity in regressional causal inference studies is used in various other problem areas. Clustering has several advantages. Firstly, hierarchical clustering provides a systematic and comprehensive method for identifying clusters that exhibit varying levels of multicollinearity, thus reducing the covariates correlation across clusters. Furthermore, clustering circumvents the need to transform data into non-interpretable entities, as required by techniques such as Principal Component Analysis or Partial Linear Regressions. This ensures that the interpretability and meaningfulness of the variables are preserved throughout the analysis. In addition to its effectiveness, the proposed methodology is characterized by its case of implementation. It can be readily applied to diverse applications facing similar challenges related to multicollinearity. The key lies in understanding the inherent properties of the data to define an appropriate distance metric for clustering that effectively reduces multicollinearity. This contributes to enhancing the robustness and reliability of regressional causal inference studies.

Example Process for Applying Hierarchical Clustering

Figure 10:
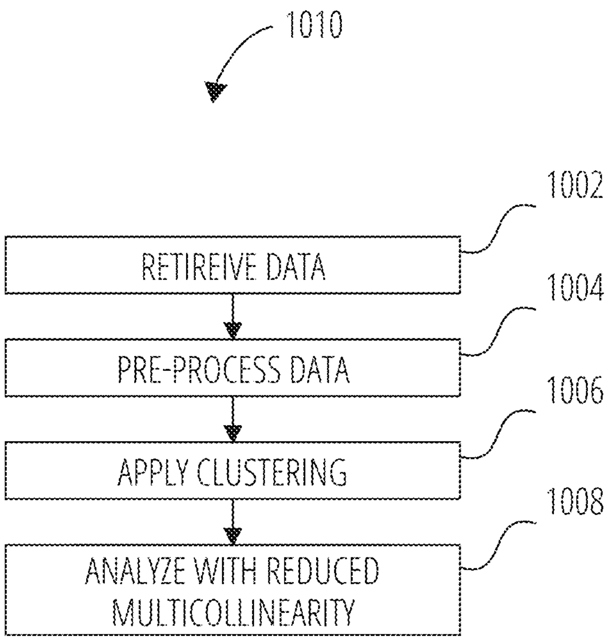
FIG. 10 illustrates a process suitable for using clustering techniques, according to some examples.

FIG. 10 illustrates an embodiment of a process 1010 suitable for applying the hierarchical clustering techniques described herein. The process 1010 can be performed by a computing system, such as the server system 100 and/or the multicollinearity system 130. In the depicted example, the computing system retrieves, at block 1002, data for pre-processing from one or more datastores. In some examples, the data includes marketing data related to the use of various channels as well as resulting sales, such as sales of listings via the listing network platform 128, during various time periods, such as weeks. In certain examples, the data includes customer service data, pricing data, product optimization data, and the like. The data can be stored in one or more databases, such as database 124, one or more databases associated with third-party servers 112, or other data stores.

At block 1004, the computing system pre-processes the retrieved data and prepares a model, such as the MMM model described earlier with respect to Equation 1. Model preparation involves the selection of one or more parameters, such as the correlation coefficient α, the channel specific impact parameter β, delayed realization of impact coefficient $\theta_k$, and so on, based on the characteristics of the data. In some examples, two steps are taken to pre-process data in preparation for descriptive analysis and modeling. First, the computing system normalizes bookings, channel impressions, and the covariate, to establish a common scale across DMAs of different sizes. Normalization is a statistical technique used to adjust diverse data points to a common scale. To normalize this data the computing system applies one or more normalization algorithms, such as Min-Max scaling, Z-score normalization or standardization, and/or unit vector normalization. Min-Max scaling rescales a desired feature to a fixed range, usually 0 to 1. Z-score normalization or standardization involves rescaling the data to have a mean (average) of 0 and a standard deviation of 1. Unit vector normalization scales the data such that the length of the vector of the data points (in multi-dimensional space) is 1. Normalization then results in data that has a common scale. Normalizing the data improves the ability to interpret the impact of a certain level of marketing activity.

Second, the computing system decomposes channel impressions into common trend, seasonality, and residual variation across DMAs, to focus on correlation in the residual variation. For example, Principal Component Analysis (PCA) can be used to decompose the data into several components, namely common trend, seasonality, and residual variation. Common trend captures the long-term progression of the data, showing how the channel impressions increase or decrease over time, independent of seasonal fluctuations or irregular occurrences. The trend component is used for understanding the overall direction and growth or decline in channel impressions. Seasonality reflects regular and predictable cycles or patterns that repeat over a specific period, such as weekly, monthly, or annually. In the context of marketing, seasonality might capture increased advertising impressions during holiday seasons, back-to-school periods, or other cyclic events that predictably affect consumer behavior. After the trend and seasonality are accounted for, the residual variation includes the randomness or irregularities left in the data. These are the fluctuations that cannot be attributed to the systematic trend or seasonal effects. Decomposition can be achieved through various statistical methods depending on the nature of the time series data and the specific requirements of the analysis. PCA is used to reduce the dimensionality of a dataset by transforming it into a new set of variables called principal components. Decomposition can also be achieved via additive decomposition or multiplicative decomposition. Additive decomposition assumes that the components are added together to form the observed data. It's used when seasonal variations are roughly constant through the series. Multiplicative decomposition assumes that the components are multiplied together. Multiplicative decomposition is useful when seasonal variations change proportionally over time.

At block 1006, the computing system clusters the data. In certain embodiments, hierarchical clustering is performed. For example, the computing system utilizes hierarchical clustering to group geographical locations based on their correlation patterns as determined by a distance metric. As mentioned earlier, each DMA is placed inside its own cluster, so there are N clusters at level 0. Next, a second clustering step occurs, where all the clusters now have at least two DMAs, and the DMAs in each cluster have the most similar $\text{Distance}_{ij}$ of Equation 4. That is, level 0 DMAs having the smallest $\text{Distance}_{ij}$ between them are merged into a single cluster. This process is repeated, progressively reducing the number of clusters and increasing the distance at which clusters are combined. As distances increase, clusters merge together, indicating the grouping of DMAs into clusters based on their $\text{Distance}_{ij}$ similarity.

An aspect of this approach lies in defining the distance metric used in the clustering algorithm. In the described methodology, the distance between two DMAs is defined as the sum of channel-specific distances, such as $\text{Distance}_{ij}$. Each channel-specific distance measures the similarity in the cross-channel correlation between the two geographical locations. Clustering at block 1006 additionally includes applying a desired cutoff distance to realize a desired correlation, thus limiting the total number of clusters. For example, a cutoff of 1.5 corresponds to correlation of at least 0.33.

Once the data is hierarchically clustered, the computing system analyzes the data at block 1008 based on the resulting clusters now having reduced multicollinearity. That is, each cluster now has DMAs that have reduced multicollinearity among the DMAs. Consider a scenario where a company advertises across multiple channels and wants to understand the impact of each channel on sales. If expenditures on these channels are highly correlated (e.g., increased spending on social media ads correlates with increased spending on online banners), traditional regression analysis might suffer from multicollinearity. By clustering geographic regions into groups that exhibit similar spending patterns across these channels, the company can analyze each cluster separately. This approach not only reduces multicollinearity but also allows for tailored marketing strategies that are more optimized for the characteristics of each cluster.

The analysis at block 1008 incorporates the use of MMM models, such as Equations 1 and 2. For example, DMAs and related data for a given cluster or set of clusters can be analyzed by calculating $$y_{g,t} = \mu t^k + \text{seasonality}_{g,t} + \alpha Z_{g,t} + \beta \sum_{k=1}^{k} AdStock(x_{g,t}) + \epsilon_{g,t}$$

as well as $\text{AdStock}_{k,g}$, and the resultant calculations can then be used to create certain visualizations, for example, of impression impact and carryover. That is, individual clusters are analyzed in isolation via MMM techniques, thus providing for an analysis that has a reduced multicollinearity. While only certain MMM techniques are described herein as non-limiting examples, such as via Equations 1 and 2, it is to be understood that any MMM technique can be applied to each individual cluster.

In certain examples, the computing system additionally generates visualizations helpful in determining, for example, spending effects on each individual cluster. For example, percent change relative to DMA-level graphs, such as the graph 704 are created and presented to the user. Likewise, impact parameter graphs and carryover parameter graphs, such as impact graphs 902, 904 and carryover parameter graphs 906, 908 are created and presented. It is to be noted that any number of other graph types can be created by analyzing each cluster, including radar graphs to visualize spend, pie charts to look at individual channel carryover effects, bar charts to describe impression impacts, and so on. By reducing multicollinearity, the techniques described herein will result in a more improved analysis, including geographic analysis, such as via MMM.

Machine Architecture

Figure 11:
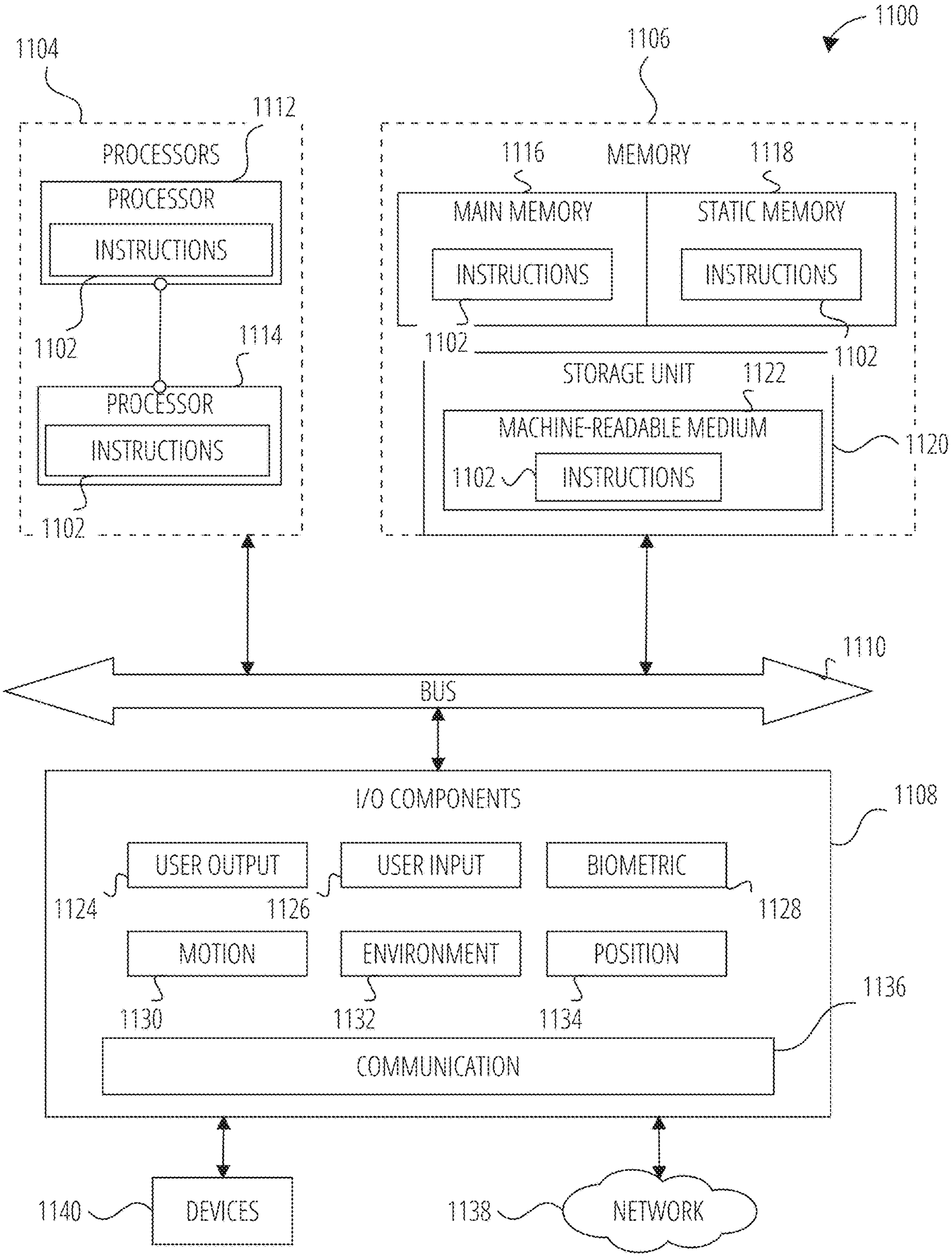
FIG. 11 is a diagrammatic representation of a machine in the form of a computer system within which a set of instructions may be executed to cause the machine to perform any one or more of the methodologies discussed herein, according to some examples.

FIG. 11 is a diagrammatic representation of the machine 1100 within which instructions 1102 (e.g., software, a program, an application, an applet, an app, or other executable code) for causing the machine 1100 to perform any one or more of the methodologies discussed herein may be executed. For example, the instructions 1102 may cause the machine 1100 to execute any one or more of the methods described herein, including process 1010. The instructions 1102 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1102, sequentially or otherwise, that specify actions to be taken by the machine 1100. Further, while a single machine 1100 is illustrated, the term "machine" shall also be taken to include a collection of machines that individually or jointly execute the instructions 1102 to perform any one or more of the methodologies discussed herein. The machine 1100, for example, may comprise the user system 102 or any one of multiple server devices forming part of the server system 110. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1108, which may be configured to communicate with each other via a bus 1110. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that execute the instructions 1102. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1116, a static memory 1118, and a storage unit 1120, both accessible to the processors 1104 via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O components 1108 that are included in a particular machine will depend on the type of machine. For example, portable machines such as mobile phones may include a touch input device or other such input mechanisms, while a headless server machine will likely not include such a touch input device. It will be appreciated that the I/O components 1108 may include many other components that are not shown in FIG. 11. In various examples, the I/O components 1108 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1108 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI)

system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 further include communication components 1136 operable to couple the machine 1100 to a network 1138 or devices 1140 via respective coupling or connections. For example, the communication components 1136 may include a network interface component or another suitable device to interface with the network 1138. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1140 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1116, static memory 1118, and memory of the processors 1104) and storage unit 1120 may store one or more sets of instructions and data structures (e.g., software) embodying or used by any one or more of the methodologies or functions described herein. These instructions (e.g., the instructions 1102), when executed by processors 1104, cause various operations to implement the disclosed examples.

The instructions 1102 may be transmitted or received over the network 1138, using a transmission medium, via a network interface device (e.g., a network interface component included in the communication components 1136) and using any one of several well-known transfer protocols (e.g., hypertext transfer protocol (HTTP)). Similarly, the instructions 1102 may be transmitted or received using a transmission medium via a coupling (e.g., a peer-to-peer coupling) to the devices 1140.

Software Architecture

Figure 12:
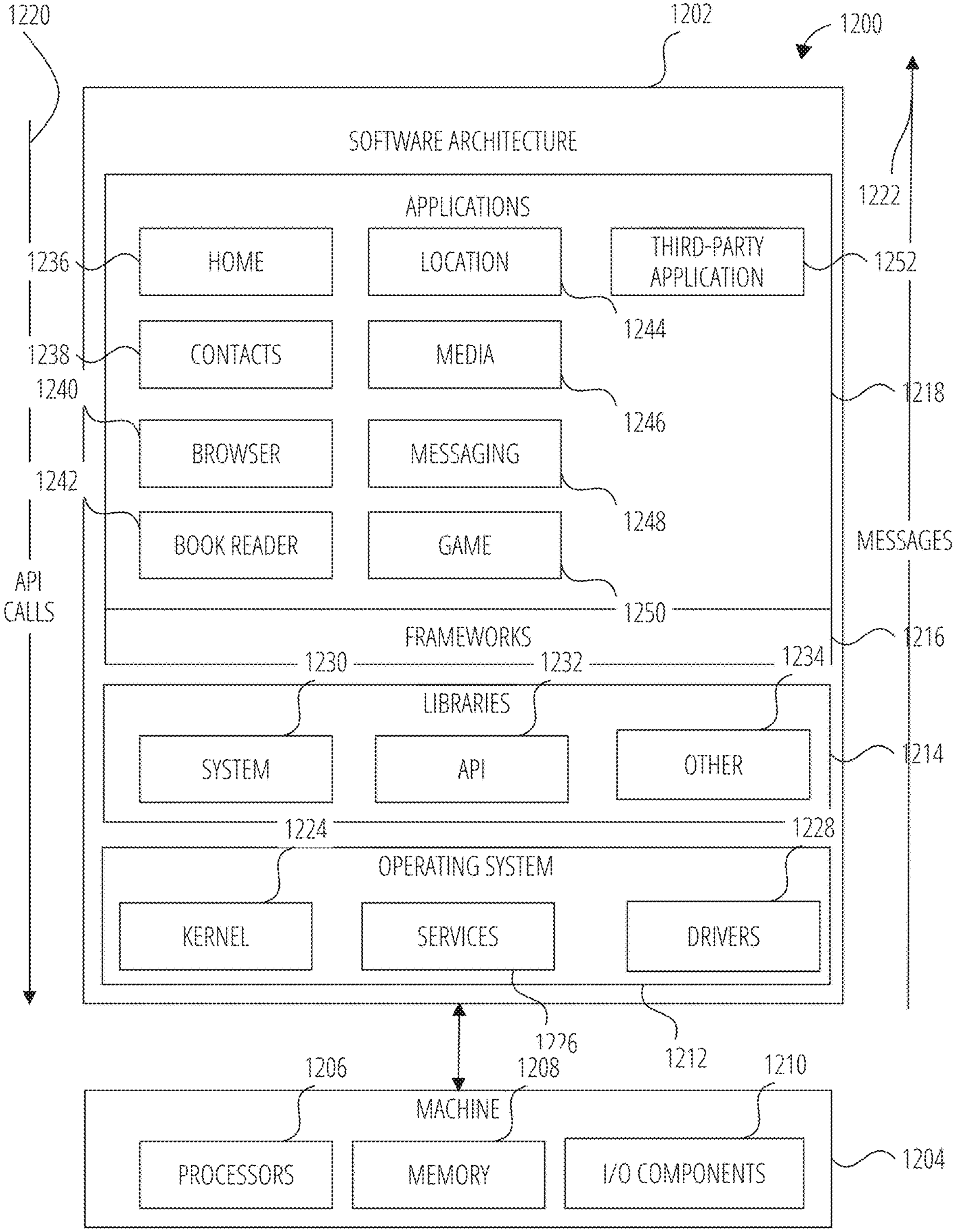
FIG. 12 is a block diagram showing a software architecture within which examples may be implemented, according to some examples.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1252 can invoke the API calls 1220 provided by the operating system 1212 to facilitate functionalities described herein.

What is claimed is:

1. A computer-implemented method, comprising:

retrieving, from a data store, data associated with a plurality of advertising channels used in a plurality of geographic units;

deriving a reduced multicollinearity data set comprising one or more hierarchical clusters by reducing a distance metric among geographic units of the plurality of geographic units that are disposed inside the one or more hierarchical clusters by performing operations comprising:

initializing each of the plurality of geographic units as a separate hierarchical cluster to create a plurality of hierarchical clusters;

merging hierarchical clusters of the plurality of hierarchical clusters having a smallest distance metric to generate a reduced number of hierarchical clusters, each hierarchical cluster of the reduced number of hierarchical clusters comprising at least two geographic units; and iteratively increasing the smallest distance metric and continuing the merging to reduce the number of hierarchical clusters until the smallest distance metric reaches a predefined maximum distance metric, to generate the reduced multicollinearity data set;

analyzing the reduced multicollinearity data set using a model to generate one or more visualizations used to increase an impression impact, increase a carryover, or a combination thereof, in at least one of the plurality of advertising channels; and causing display of the one or more visualizations on a graphical user interface of a computing device.

2. The computer-implemented method of claim 1, wherein before deriving the reduced multicollinearity data set, the method comprises:

pre-processing the data by normalizing the data to establish a common scale across the plurality of geographic units.

3. The computer-implemented method of claim 1, the predefined maximum distance metric is a cutoff distance to limit a total number of the one or more hierarchical clusters.

4. The computer-implemented method of claim 1, wherein the smallest distance metric comprises a pairwise distance metric.

5. The computer-implemented method of claim 4, wherein the pairwise distance metric comprises:

$$\text{Distance}_{ij} = \sqrt{\sum_{k=1}^{K} \text{Distance}_{ijk}^2}$$

where i is a first member of a pair of geographic units in the plurality of geographic units, j is a second member of the pair of geographic units, k is an advertising channel in the plurality of advertising channels, and $\text{Distance}_{ijk}$ is a measure that reflects correlation between two geographic units across advertising channel k.

6. The computer-implemented method of claim 5, wherein where $\text{Distance}_{ijk}=1-\text{Correlation}(X_{ik}, X_{jk})$ where $X_{ik}$ where denotes a first time series of residual impressions for advertising channel k in geographic unit i, wherein $X_{jk}$denotes a second time series of residual impressions for advertising channel k in geographic unit j, and wherein Correlation ($X_{ik}$, $X_{jk}$) is a statistical correlation coefficient between $X_{ik}$ and $X_{jk}$.

7. The computer-implemented method of claim 6, wherein the statistical correlation coefficient comprises a Pearson correlation coefficient.

8. The computer-implemented method of claim 1, wherein the model comprises a marketing mix modeling (MMM) model.

9. The computer-implemented method of claim 8, wherein the MMM model comprises an AdStock model.

10. The computer-implemented method of claim 9, wherein the MMM model further comprises:

$$y_{g,t} = \mu t^{\gamma} + \text{seasonality}_{g,t} + \alpha Z_{g,t} + \beta \sum_{k=1}^{k} \text{AdStock}\ (x_{g,t}) + \epsilon_{g,t}$$

where $y_{g,t}$ is a response variable at time t for g, g is a geographic unit in the plurality of geographic units, k is an advertising channel in the plurality of advertising channels, $\mu t^{\gamma}$ is a sales trend at time t, $\text{seasonality}_{g,t}$ is a seasonal effect for geographic unit g at time t, $\alpha$ is a correlation coefficient and $Z_{g,t}$ is a covariate variable for g at time t, $\beta$ is a channel specific impact parameter, $\text{AdStock}(x_{g,t})$ is a transformed impression that captures diminishing return, a lag of a carryover effect, the carryover effect of impressions, or a combination thereof, $x_{g,t}$ is an impression of advertising channel k, at time t, in geographic unit g, and $\epsilon_{g,t}$ is an error for geographic unit g at time t.

11. The computer-implemented method of claim 10, wherein the $\text{AdStock}(x_{g,t})$ comprises:

$$\text{AdStock}_{k,g} = \left( \frac{\sum_{l=0}^{L} \tau_k^{(1-\theta_k)^2} x_{t-l,m}}{\sum_{l=0}^{L} \tau_k^{(1-\theta_k)^2}} \right)^{\rho}$$

where L is a number of weeks, $\tau$ is a carryover rate parameter, $\rho$ is a diminishing return to scale, $x_{t-l,m}$ is a media spend at time t−1 for advertising channel m of the plurality of advertising channels, and $\theta_k$ is a delayed realization of impact coefficient for advertising channel k.

12. The computer-implemented method of claim 1, wherein the plurality of geographic units comprise a plurality of Designated Marketing Areas (DMAs).

13. The computer-implemented method of claim 12, wherein the DMAs comprise Nielsen ranking DMAs.

14. The computer-implemented method of claim 1, wherein the impression impact comprises an immediate effect metric of an advertising campaign on one or more of the plurality of advertising channels.

15. The computer-implemented method of claim 1, wherein the carryover comprises an influence metric of an advertising campaign extending beyond an immediate period during which an advertisement is run on one or more of the plurality of advertising channels.

16. The computer-implemented method of claim 1, wherein the distance metric is a sum of channel-specific distances.

17. The computer-implemented method of claim 16, wherein each channel-specific distance measures a similarity in a cross-channel correlation between two geographical locations.

18. The computer-implemented method of claim 1, wherein the one or more visualizations comprise one or more graph types, including a radar graph, a bar chart, and a pie chart.

19. A non-transitory computer-readable storage medium storing instructions that, when executed by at least one processor, cause the at least one processor to perform operations comprising:

retrieving, from a data store, data associated with a plurality of advertising channels used in a plurality of geographic units;

deriving a reduced multicollinearity data set comprising one or more hierarchical clusters by reducing a distance metric among geographic units of the plurality of geographic units that are disposed inside the one or more hierarchical clusters by performing operations comprising:

initializing each of the plurality of geographic units as a separate hierarchical cluster to create a plurality of hierarchical clusters;

merging hierarchical clusters of the plurality of hierarchical clusters having a smallest distance metric to generate a reduced number of hierarchical clusters, each hierarchical cluster of the reduced number of hierarchical clusters comprising at least two geographic units; and iteratively increasing the smallest distance metric and continuing the merging to reduce the number of hierarchical clusters until the smallest distance metric reaches a predefined maximum distance metric, to generate the reduced multicollinearity data set;

analyzing the reduced multicollinearity data set using a model to generate one or more visualizations used to increase an impression impact, increase a carryover, or a combination thereof, in at least one of the plurality of advertising channels; and causing display of the one or more visualizations on a graphical user interface of a computing device.

20. A computing device, comprising:

a memory that stores instructions; and one or more processors configured by the instructions to perform operations comprising:

retrieving, from a data store, data associated with a plurality of advertising channels used in a plurality of geographic units;

deriving a reduced multicollinearity data set comprising one or more hierarchical clusters by reducing a distance metric among geographic units of the plurality of geographic units that are disposed inside the one or more hierarchical clusters by performing operations comprising:

initializing each of the plurality of geographic units as a separate hierarchical cluster to create a plurality of hierarchical clusters;

merging hierarchical clusters of the plurality of hierarchical clusters having a smallest distance metric to generate a reduced number of hierarchical clusters, each hierarchical cluster of the reduced number of hierarchical clusters comprising at least two geographic units; and iteratively increasing the smallest distance metric and continuing the merging to reduce the number of hierarchical clusters until the smallest distance metric reaches a predefined maximum distance metric, to generate the reduced multicollinearity data set;

analyzing the reduced multicollinearity data set using a model to generate one or more visualizations used to increase an impression impact, increase a carryover, or a combination thereof, in at least one of the plurality of advertising channels; and causing display of the one or more visualizations on a graphical user interface of a computing device.

* * * * *